Nov. 1, 1938.   J. R. COOLIDGE   2,135,463
WOOD IMPREGNATING APPARATUS
Filed July 31, 1936   3 Sheets-Sheet 1

Nov. 1, 1938.  J. R. COOLIDGE  2,135,463
WOOD IMPREGNATING APPARATUS
Filed July 31, 1936  3 Sheets-Sheet 2

INVENTOR
Joseph R. Coolidge
BY
ATTORNEY

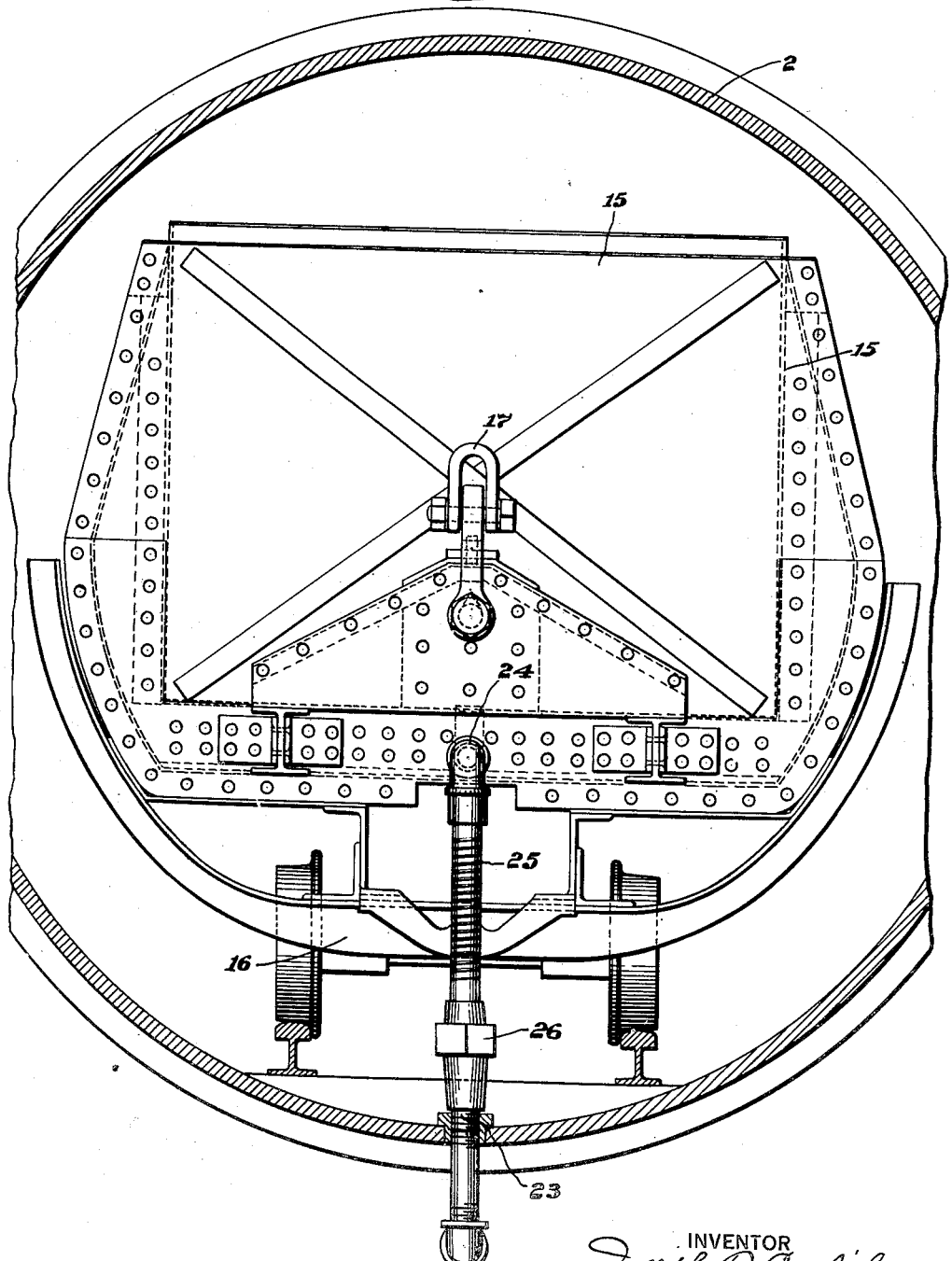

Patented Nov. 1, 1938

2,135,463

UNITED STATES PATENT OFFICE 2,135,463

WOOD IMPREGNATING APPARATUS

Joseph Randolph Coolidge, Sandwich, N. H., assignor, by mesne assignments, to Montan Pole Co., Boston, Mass., a corporation of Massachusetts Application July 31, 1936, Serial No. 93,561

1 Claim. (Cl. 21—65)

Most wood impregnating plants are designed primarily for the impregnation of wood with creosote oil. When it is desired to impregnate with some other treating agent in which even a very small quantity of creosote would be objectionable, it then becomes necessary to clean out thoroughly the treating cylinder and usually, also, the working and measuring tanks and the supply tank, before the treatment can be given. As is well understood by those skilled in this art, these treating cylinders are very large, a typical cylinder being perhaps eight feet in diameter and eighty or one hundred feet, or more, in length. Consequently, the matter of cleaning the treating equipment satisfactorily may take from one to two days' time and is a relatively expensive matter. In some plants where the demand for treatments with impregnating agents other than creosote oil warrants the expenditure, it is customary to install a separate cylinder for treating with these substances, but the number of plants so equipped is relatively small. At the same time there is frequent demand for special treatments of relatively small quantities of timber, say a few thousand feet, and the plants equipped fundamentally for creosote treatments necessarily are compelled to charge a relatively high price for work of this type because of the expense and loss of time involved in cleaning the cylinder and making the other changes necessary to give such treatments.

The present invention deals especially with the problem presented by these conditions. It aims to improve wood impregnating plants and apparatus with a view to materially reducing the expense, loss of time, and inconvenience involved in giving salt treatments and impregnations with other agents, while conducting these treatments in a creosote cylinder and with the aid of much of the usual creosote plant equipment.

The nature of the invention will be readily understood from the following description when read in connection with the accompanying drawings, and the novel features will be particularly pointed out in the appended claim.

In the drawings,

Fig. 3 is a sectional view through the treating cylinder, and showing a supplemental treating tank in said cylinder, said tank being made in accordance with this invention; and Fig. 4 is a diagrammatic sectional view of the treating cylinder and the supplemental tank showing certain auxiliary equipment.

Figure 1:
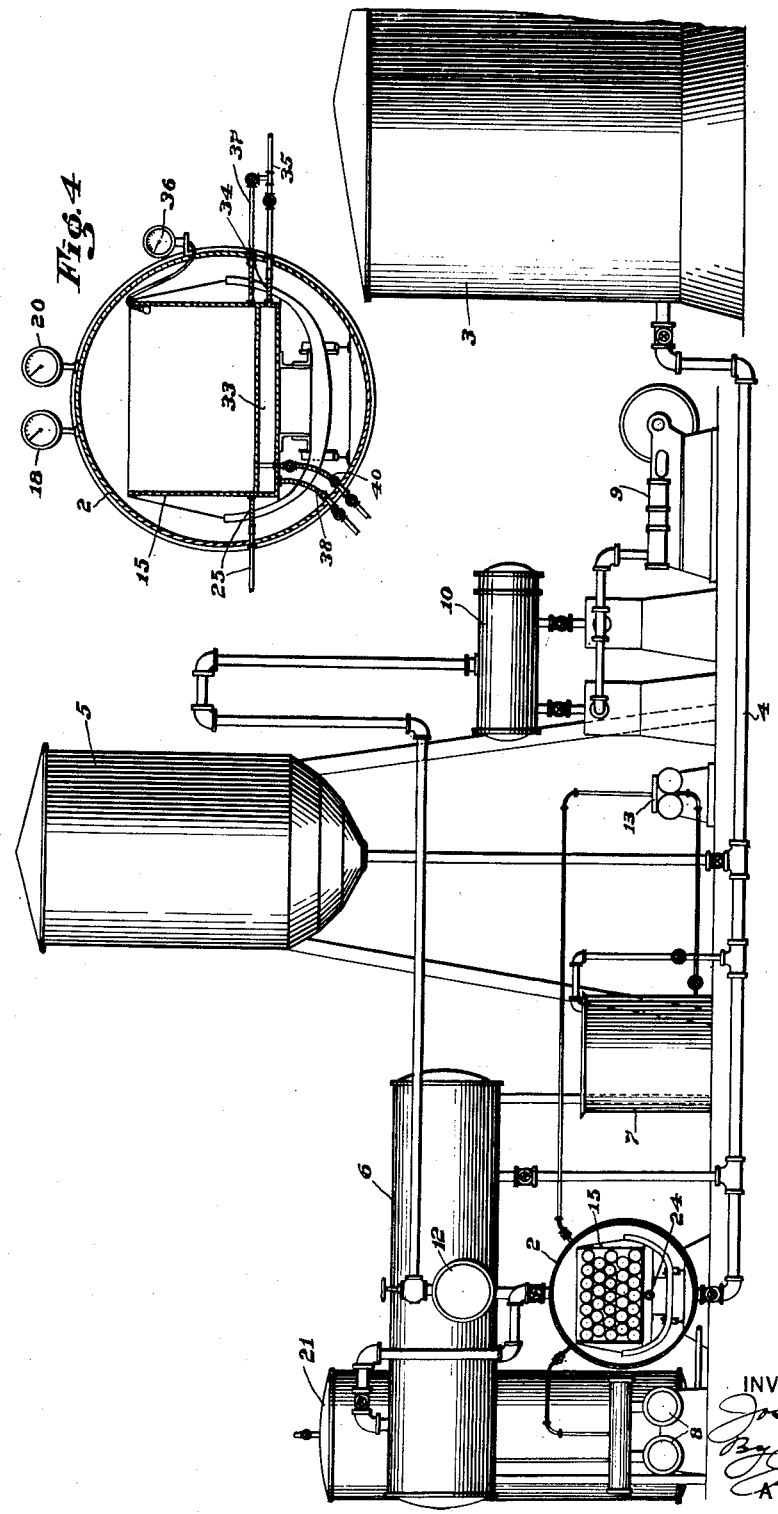
Figure 1 is a diagrammatic view of a typical wood impregnating plant or apparatus, modified in accordance with the present invention.

Referring first to Fig. 1, the wood impregnating apparatus there shown comprises a pressure treating cylinder 2, a storage tank 3 for the creosote oil, a supply line 4 leading from said tank to said cylinder, a working tank 5, a pressure tank 6, a measuring tank 7, an air compressor 8, vacuum pump 9, condenser 10, vapor drum 12, oil pressure pump 13, together with the usual piping connections and other auxiliaries commonly used in such a plant, this entire apparatus being constructed, organized and arranged in a manner typical in this industry. The method of using such an apparatus in giving the usual empty cell, full cell, and other creosote treatments, are well known to those skilled in this art.

The present invention makes use of much of this equipment, depending upon the nature of the treatment to be given. It includes, however, a supplemental open top treating tank 15, best shown in Figs. 2 and 3, this tank being mounted on any suitable number of cars or trams 16 of the general type used in treating plants. The tram is run on the rails or track with which the treating cylinder is customarily equipped so that the tank can be run into and out of the cylinder, at will. It is contemplated that while the tank is not in use it may simply be stored at any convenient point in the yard or the plant, and it is provided at each end with a clevis 17 by means of which it can be picked up by a locomotive crane, or the like, lifted off the trams, and set into a convenient storage space. The dimensions of such a tank necessarily will vary with the requirements of different treating plants. A typical size might, for example, be four by five feet in height and width, respectively, and say forty feet, or more, long. It may or may not be provided with a removable cover, as desired. Such a tank will hold a sizeable charge of lumber, or wood in any other form, to be treated, it can be run into the cylinder 2, the cylinder closed, and, with the aid of suitable auxiliary apparatus, can be filled with treating liquid, and a pressure treatment conducted exactly as it would be in any pressure cylinder, use being made of the air compressor 8 to apply the degree of pressure required for the treatment, and of the vacuum pump 9, in the event that a vacuum is required, the usual pressure and vacuum gauges with which the cylinder is equipped and which is shown diagrammatically at 18 and 20, Fig. 4, being utilized in the control of the pressure conditions within the cylinder during the treatment.

Figure 2:
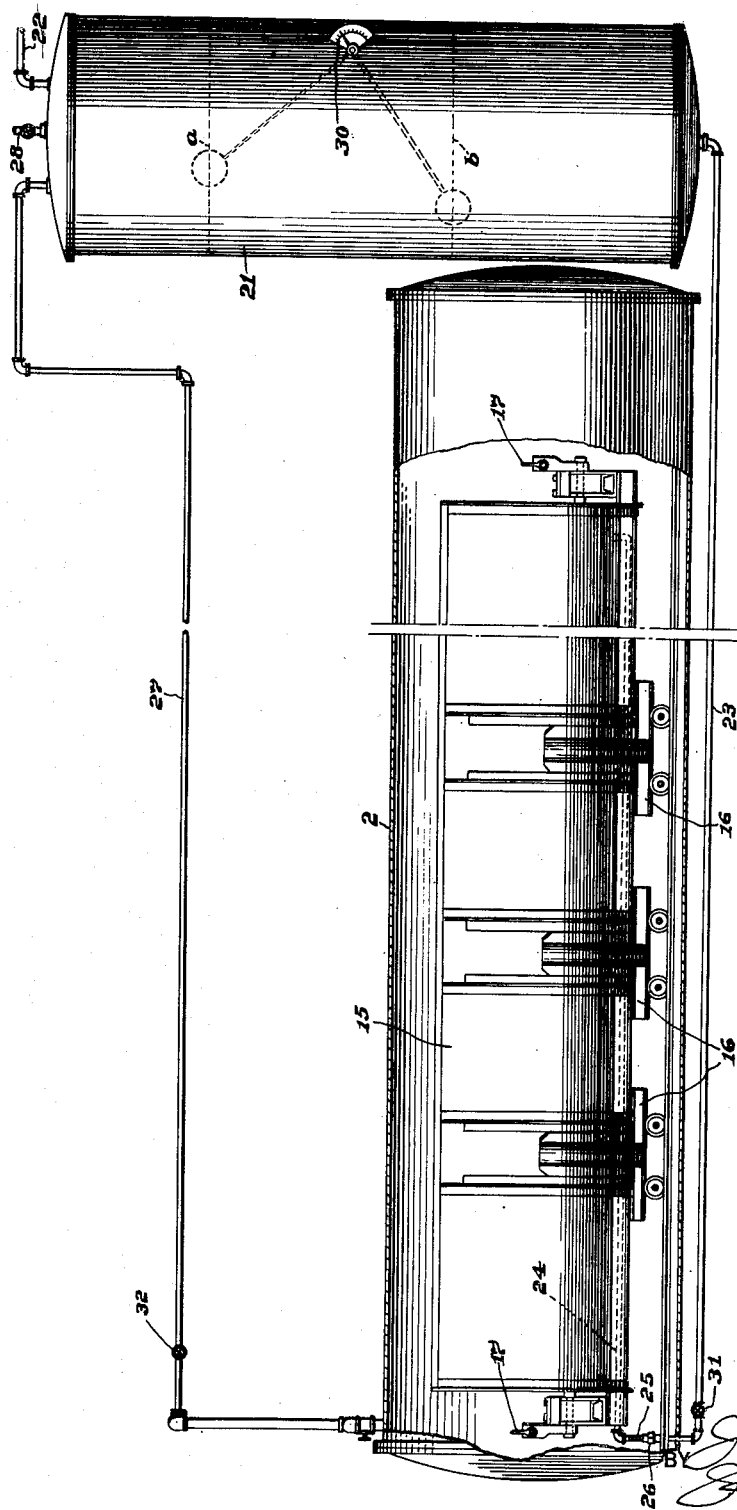
Fig. 2 is a side elevation of the main treating cylinder shown in Fig. 1, together with certain additional equipment, embodying features of this invention.

For the purpose of supplying the treating liquid to the tank 15, an auxiliary supply tank 21, Figs. 1 and 2, is mounted in some convenient location and is connected through one or more pipe lines 22 with the mixing tanks and supply pump. A pipe line 23 leads from the bottom of this tank to some convenient point in the cylinder 2 where a connection can be made between it and the treating tank 15. In the particular arrangement shown, this pipe 23 terminates at the bottom of the cylinder, but inside the latter, and the end of the pipe normally is closed by a plug. When the supplemental tank 15 is to be used, and after it has been run into the cylinder 2, the plug is removed and the supply pipe 23 is connected to the end of the filling pipe 24 in the tank by means of a flexible pipe 25, preferably including a coupling 26. The upper end of the tank is connected by an air line 27 with the pressure tank 6, or with the pipe line running from this tank to the cylinder 2. Preferably, also, the tank 21 is provided with a valved vent pipe 28 and with a gauge 30 for indicating the level of the liquid in the tank.

An important problem in using an auxiliary apparatus of this kind is to be able to gauge the liquid level in the tank 15 as the treatment progresses in order to determine the volume of impregnating medium forced into the wood. I find that this problem can be conveniently solved by so conducting the process that the liquid level in the tank 21, at the completion of the initial filling of the tank 15, and thereafter during the process, will be the same as that in the tank 21 and it can thus be measured by the gauge 30.

A typical method of procedure is to run the tank 15, together with its charge, into the cylinder and connect it up in the manner above described. The cylinder may then be closed and sealed. If no preliminary treatment is to be given prior to filling the auxiliary tank with the impregnating liquid, then this filling operation may be completed before closing the tank. Frequently, however, the treatment calls for a preliminary air pressure to be maintained on the wood for a specified length of time prior to admitting the liquid. In either case the volume of liquid pumped into the tank 21 preferably is made such that when the tank 15 has been filled to the desired level as indicated, for example, by the dotted line b, Fig. 2, the liquid in the supply tank 21 will be at the same level. This can readily be done by properly controlling the initial level a and having the gauge 30 graduated in gallons, or other convenient units of measure. The volume of the tank 15 is known, and the volume of the wood in the charge can be estimated within very close limits. Consequently, the volume between the lines a and b which is required to cover the charge to the desired depth can readily be calculated.

As the treatment progresses, the volume of liquid forced into the wood can easily be determined by reading the gauge 30. Since the air pressure in the tank 21 and cylinder 22 is equalized through the air line 27, the reading of the gauge is not disturbed by the fact that there may be a pressure of one hundred pounds per square inch, or more, in the cylinder. The initial admission of liquid to the tank 15 is controlled by the manipulation of the valve 31, Fig. 2, in the supply line 23, and at the completion of the process the treating liquid may be forced back into the tank 21 by closing the valve 32 in the air line 27, opening the vent 28, and allowing the air pressure in the cylinder to force the liquid out, this procedure being essentially like that in the regular treating apparatus.

The invention thus makes it possible to treat relatively small quantities of wood with aqueous and other impregnating agents in a creosote cylinder and without cleaning the cylinder. This is an extremely important advantage, more especially in the smaller treating plants, but also in others, since it enables the plant to give economically treatments with a great variety of impregnating agents, such as clear oils, waxes in liquid form, zinc chloride, Wolman's salts, sodium chloride, "Celcure", fire retarding agents, and numerous other treatments, in all of which the presence of even a very small proportion of creosote would not be tolerated. The invention is also useful in impregnating plants used primarily for salt treatments, but in which the same necessity for cleaning the cylinder and auxiliary tanks arises when it is desired to treat with other impregnating agents.

If desired, the supplemental tank 15 may be provided with a heating coil or steam jacket, as indicated at 33, Fig. 4, which may be connected through a flexible hose 34 with a steam supply pipe 35 in essentially the same manner that the connection 25 is made. Also, a thermometer, thermostat, or temperature recorder may be connected to the cylinder with the registering element of the apparatus outside, as shown at 36, the temperature responsive member being flexibly connected to the indicator so that temperature conditions in the treating bath may be observed continuously throughout the process.

A live steam connection into the tank, as shown at 37, Fig. 4, also is useful in connection with steam seasoning of the charge of wood, in the event that such a step becomes desirable. The water of condensation from the jacket 33 or the tank 15 may be carried away in any convenient manner. As shown, a flexible connection 38, similar to the connection 25—26, may be made to conduct condensate away from the jacket 33, while a similar connection 40 runs to the bottom of the tank 15 to carry the water away from this point. Valves in these connections, and located outside the cylinder, afford convenient control of this part of the equipment.

While I have herein shown and described a typical embodiment of my invention, it will be understood that the invention may be embodied in other forms without departing from the spirit or scope thereof.

Having thus described my invention, what I desire to claim as new is:

In a wood impregnating apparatus, the combination with a pressure treating cylinder equipped with a track adapted for the travel of cars into and out of the cylinder, and mechanism for creating high fluid pressure conditions in said cylinder, of a supplemental treating tank mounted for movement on said track into and out of said cylinder, a supplemental supply tank for treating liquid, means for connecting said supplemental supply tank with said treating tank to conduct said treating liquid to the latter while it is enclosed in said cylinder, whereby said mechanism may be utilized in the impregnation of charges of wood in said supplemental tank, means for equalizing the fluid pressure conditions during the treating operation in said supplemental supply tank and said treating tank, whereby the same liquid level can be maintained in both, and gauging means for indicating variations in said level as the treating operation progresses.

JOSEPH RANDOLPH COOLIDGE.